United States Patent [19]

Samuels

[11] Patent Number: 5,516,816

[45] Date of Patent: May 14, 1996

[54] FRICTION COMPOSITION AND FRICTION ELEMENT FABRICATED THEREFROM

[75] Inventor: George J. Samuels, Somerset, N.J.

[73] Assignee: AlliedSignal Inc., Morris Township, N.J.

[21] Appl. No.: 17,172

[22] Filed: Feb. 12, 1993

[51] Int. Cl.⁶ .................................................. C08J 5/14
[52] U.S. Cl. ...................... 523/149; 523/152; 523/153; 523/155; 524/430; 524/439
[58] Field of Search .................................. 524/430, 439; 523/149, 152, 153, 155

[56] References Cited

U.S. PATENT DOCUMENTS

| | | | |
|---|---|---|---|
| 3,455,868 | 7/1969 | D'Alessandro | 260/38 |
| 3,966,670 | 6/1976 | Grasea et al. | 260/38 |
| 4,096,108 | 6/1978 | Webb et al. | 260/33 |
| 4,218,361 | 8/1980 | Sourberg et al. | 260/38 |
| 4,219,452 | 8/1980 | Littlefield | 260/3 |
| 4,239,666 | 12/1980 | Jacks et al. | 260/17.5 |
| 4,268,657 | 5/1981 | Manzara | 528/155 |
| 4,657,951 | 4/1987 | Takarada et al. | 523/153 |

*Primary Examiner*—Paul R. Michl
*Assistant Examiner*—U. K. Rajguru
*Attorney, Agent, or Firm*—Melanie L. Brown; Roger H. Criss

[57] ABSTRACT

This invention relates to a friction composition comprising oxidized or phoisphotized metal fibers and to friction elements fabricated therefrom.

25 Claims, 1 Drawing Sheet

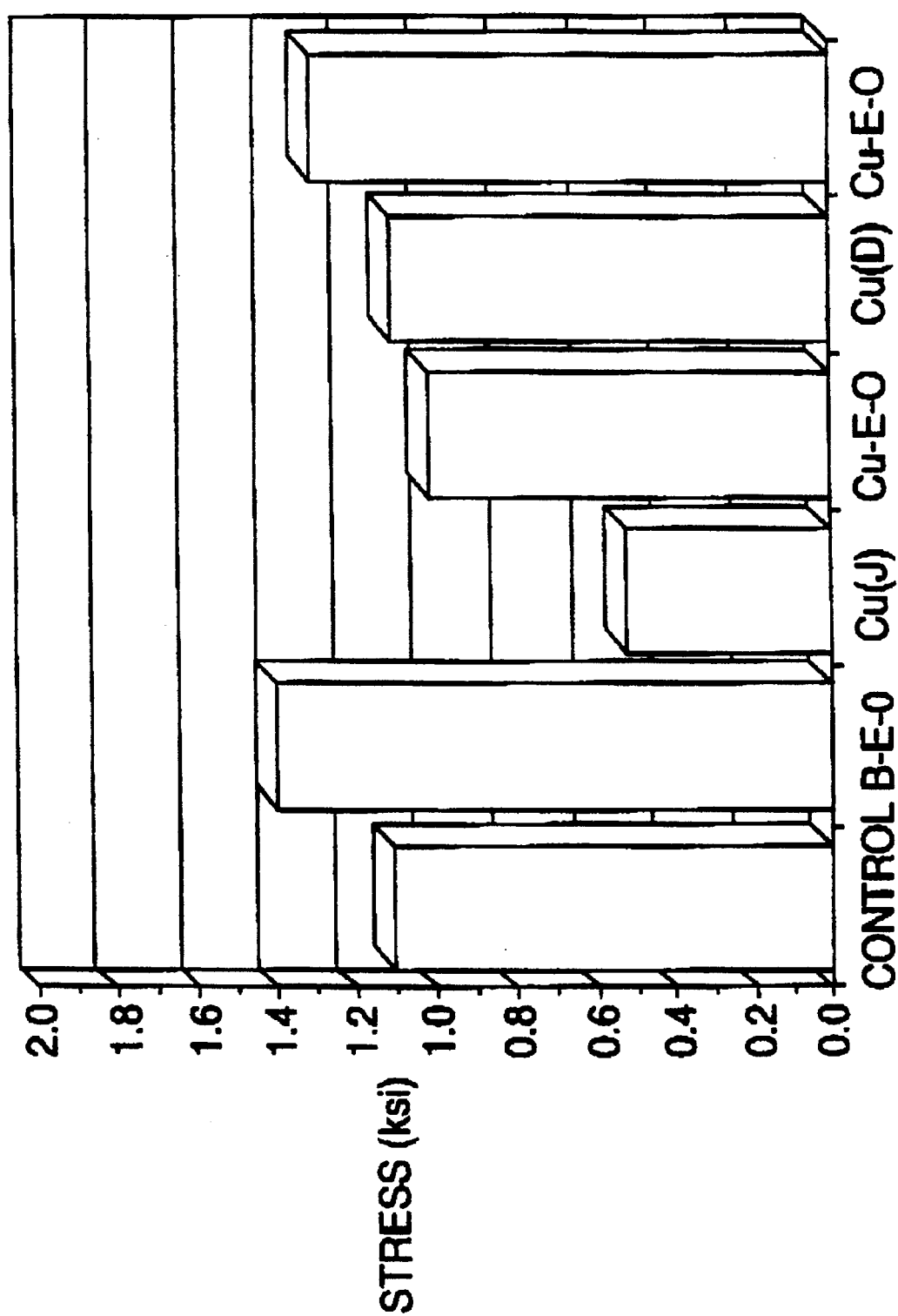

FRICTION COMPOSITION AND FRICTION ELEMENT FABRICATED THEREFROM

BACKGROUND OF THE INVENTION

1. Field of the Invention

This invention relates to friction compositions and to friction elements fabricated therefrom such as clutch pads, brake blocks, drum brake linings, disc pads and the like. More particularly, this invention relates to such compositions and elements having improved tensile strength and fracture toughness without affecting the friction performance of the composition and element.

2. The Prior Art

Friction resistant compositions are useful in the fabrication of a variety of articles such as brake linings and clutches. The compositions are generally formed from a fibrous thermally stable reinforcing material, various metallic or non-metallic powdered or particular solid fillers and a binder resin to hold the mass together. See for example, U.S. Pat. Nos. 4,239,666; 4,268,657; 4,218,361; 4,219,452; 3,455,868 and 4,657,951.

SUMMARY OF THE INVENTION

One aspect of this invention relates to an improved friction composition of the type comprising a friction resistant filler in a binding resin, the improvement comprising friction resistant filler selected from the group consisting of oxidized metal fiber, phosphatized metal fibers, oxidized/phosphatized metal fibers or a combination thereof and to a friction element formed from he composition of this invention. As used herein, "friction composition" and "friction element" is intended to be descriptive of that class of compositions and elements used to develop a coefficient of friction when applied against a surface without substantially cutting, wearing away or rubbing off that surface but which are designed to gradually wear away in use to maintain the original surface conditions of friction composition and element. The composition and element of this invention exhibit improved properties as compared to friction compositions and elements which do not include the critical friction resistant fillers as for example asbestos fiber or metal fibers which have not been oxidized or phosphatized. For example, the composition and element of this invention exhibit improved fracture toughness and tensile strength (as evaluated by ASTM E 399) without adversely affecting the friction performance of the composition or element (as evaluated by specific product testing criteria) to an undue extent.

BRIEF DESCRIPTION OF THE DRAWINGS

The advantages and articles made of the present invention can be recognized by those skilled in the art by reference to the accompanying figures and the following description.

FIG. 1 is a bar graph of tensile stress for a given reinforced composite material.

DESCRIPTION OF THE PREFERRED EMBODIMENTS

The composition of this invention includes two essential ingredients. One essential ingredient are a plurality of metal fibers comprising an oxidized, phosphatized, or oxidized/phosphatized coating on all or a portion of the surface thereof or a combination thereof. As used herein, "fibers" are metal bodies whose length dimensions are greater than their cross-sectional dimensions such as width and diameter. The length and cross-sectional dimensions of the fibers may widely. For example, fibers may have circular, oblong, polygonal and like cross-sections. Preferably, fibers for use in this invention are of substantially circular cross-section and have an average length equal to or less than about 0.05 cm and a maximum length of not more than about 0.5 cm, and an average diameter equal to or greater than about 0.01 cm and maximum diameter of not more than about 0.05 cm. In the preferred embodiments of this invention, average fiber lengths are from about 0.2 cm to about 0.3 cm with a maximum fiber lengths equal to about 0.3 cm; and average fiber diameter is from about 0.01 to about 0.02 cm with a maximum fiber diameter equal to about 0.02 cm. In the more preferred embodiments of this invention, average fiber lengths are from about 0.1 to about 0.3 cm, with a maximum length of about 0.3 cm; and an average diameter of from about 0.01 to about 0.02 cm with a maximum diameter of about 0.02 cm.

Oxidized metal fibers, phosphatized metal fibers, oxidized/phosphatized fibers or a combination thereof are used in the practice of this invention. As used herein, "oxidized metal fibers" are metal fibers having an oxidized layer on all or a portion of the surface thereof and "phosphatized metal fibers" are metal fibers having a phosphatized layer on all or a portion of the surface thereof and "oxidized/phosphatized metal fibers" are metal fibers having an oxidized and phosphatized layer on all or a portion of the surface thereof. In the preferred embodiments of the invention all or substantially all of the surface of the metal fiber is oxidized, phosphatized or oxidized and phosphatized. In the more preferred embodiments of the invention oxidized metal fibers are used.

The type of metal fibers used in this invention may vary widely. Illustrative of useful metal fibers are fibers formed of metals such as brass; brass based alloys; bronzes; bronze based alloys; steel; iron; copper; copper based alloys (such as beryllium copper), aluminum; aluminum alloys, such as high temperature aluminums; and the like. Useful fibers also included fibers having a core formed of an inorganic material coated with a metal as for example, metal coated carbon fibers such as nickel coated carbon fiber and copper coated carbon fiber. Metal coated coated fibers having an organic core as for example, metal plated polymeric fibers such as metal coated polyamide fibers, e.g. copper and nickel plated nylon 6 and nylon 66 fibers; metal coated polyester fibers, e.g. copper and nickel plated poly(ethylene terephthalate), poly(butylene terephthalite) and poly(ethylene naphthalate) fibers; metal plated polyolefin fibers, e.g. copper and nickel plated polyethylene, polypropylene and copolymers of ethylene/propylene/isoprene/butadiene/styrene and the like; copper and nickel metal plated phenolic fibers; and copper and nickel metal plated polyfluorocarbon fibers, e.g. copper and nickel coated poly(tetrafluoroethylene) fibers.

Preferred fibers are those formed of metals and more preferred fibers are those formed of brass, bronze, copper, steel, and aluminum. Most preferred fibers are those formed of copper or brass. Metal fibers of choice are those formed of copper which provide friction materials having superior friction and wear properties as compared to friction materials having brass fiber.

The phosphatized or oxidized metal fibers can be manufactured through use of conventional techniques. For example, oxidized and phosphatized fibers can be conveniently prepared by techniques described in The Phosphatizing of Metals 2nd edition by Werner Rausch, Metals Handbook: Vol 5 Surface Cleanng, Finishing and Coating by ASM International, and The Surface Treatment and Finishing of Aluminum and its Alloys, Vols 1 and 2, by S. Wernick, R. Pinner and P. Sheasby. Oxidized copper or brass fibers can be manufactured by using commercially available processes for those skilled in the art of mass metal finishing. For a listing of companies that supply the appropriate finishing systems consult the Products Finishing Directory -1992. In general, the metal fibers are degreased, dipped in dilute acid, put in contact with the metal finishing solution (such as mixtures of sodium chlorite, sodium hydroxide, and stabilizing agents), and then the fibers are spray rinsed.

The thickness of the oxidized or phosphatized coating is not critical and such thickness may vary widely. For example, coating thickness can be low as 5 nanometers or less and as high as 1 or 10 microns or more.

The amount of fibers incorporated in the compositions of this invention may vary widely and can be selected from those amounts of fibrous particulate material which are usually employed in friction materials. Typically, the amounts of fibers is at least about 3.5% by weight of the composition. The amount of fibers included in the composition is preferably from about 5 to about 50 wgt. %, more preferably from about 10 to about 45 wgt % and most preferably from about 15 to about 30 wgt %, based on the total weight of the composition.

As a second essential ingredient, the friction material of this invention includes a polymeric binder material. The polymeric binder used is not critical and any polymeric binder used in conventional friction compositions can be conveniently employed. Illustrative of such polymeric binders are thermosetting resins. As used herein "thermosetting resins" are resins which do not tolerate thermal cycling and which cannot be resoftened and reworked after molding, extruding or casting and which attain new, irreversible properties when one is set at a temperature which is critical to each resin.

The choice of any thermosetting resin for use in the composition of this invention may vary widely depending on the desired characteristics of the composition and factors known to those of skill in the art. In conventional thermosetting resins for friction compositions, one important characteristic of the matrix material is its modulus which is preferably equal to or greater than about 500 psi (3,450 kPa). The upper limit for the modulus is not critical and usually the higher the modulus the more desirable are composite properties. In the preferred embodiments of the invention, the matrix material is selected such that the matrix material has a modulus equal to or greater than about 500 psi (3,450 kPa), and in the particularly preferred embodiments, these resins are selected such that the matrix material has a modulus equal to or greater than about 2,000 psi (13,800 kPa). In the most preferred embodiments of the invention, the thermoplastic and thermosetting resins are selected such that the matrix material has a modulus equal to or greater than about 5,000 psi (34,5000 kPa).

Thermosetting resins useful in the practice of this invention may vary widely. Illustrative of useful thermosetting resins are alkyds such as those derived from esterification of polybasic acids, as for example, phthalic anhydride, fumaric acid, maleic anhydride, isophthalic acid, terephthalic acid, trimesic acid, hemimellitic acid, succinic anyhydride, fatty acids derived from mineral or vegetable oils and the like, and polyhydric alcohols as for example glycerol, ethylene glycol, propylene glycol, pinacol, 1,4- butanediol, 1,3-propandediol, sorbitol, pentaerythritol, 1,2-cyclohexanediol and the like. Other useful thermosetting resins are acrylics such as crosslinkable polyacrylics, polyacrylates, epoxdiacrylates, urethane diacrylates and the like. Still other useful thermosetting resins are amino resins derived from reaction between formaldehyde and various amino compounds such as melamine, urea, aniline, ethylene urea, sulfonamide, dicyanodiamide and the like. Other useful thermosetting resins include urethanes derived from reaction between formaldehyde and various amino compounds such as melamine, urea, aniline, ethylene urea, sulfonamide, dicyanodiamide and the like. Still other useful thermosetting resins include urethanes derived from reaction of polyisocyanates or diisocyanates such as 2,6-tolylene diisocyanate, 2,4- tolylene diisocyanate, 4,4'-diphenyl-methane diisocyanate, 4,4'-dicyclohexyl-methane diisocyanate, 4,4'-dicyclohexyl-methane diisocyanate and the like, and polyols such as glycerin, ethylene glycol, diethylene glycol, trimethylolpropane, 1,2,6- hexanetriol, sorbitol, pentaerythritol and the like.

Exemplary of still other thermosetting resins useful in the practice of this invention are unsaturated polyesters derived from reaction of dibasic acids such as maleic anhydride, fumaric acid, adipic acid, azelaic acid and the like, and dihydric alcohols such as ethylene glycol and propylene glycol, 1,3- butylene glycol, 2,3-butylene glycol, diethylene glycol, dipropylene glycols and the like; and silicones such as dimethyldichlorosilane and the like;

Yet another class of useful thermosetting resins are epoxies based on saturated or unsaturated aliphatic, cycloaliphatic, aromatic and heterocyclic epoxides. Useful epoxides include glycidyl ethers derived from epichlorohydrin adducts and polyols, particularly polyhydric phenols. Another useful epoxide is the diglycidyl ether of bisphenol A. Additional examples of useful polyepoxides are resorcinol diglycidyl ether, 3,4- epoxy-6- methylcyclohexylmethyl -9, 10-epoxystearate, 1,2-bis(2,3- epoxy-2-methylpropoxy) ethane, diglycidyl ether of 2,2-(p- hydroxyphenyl) propane, butadine dioxide, dicyclopentadiene dioxide, pentaerythritol tetrakis(3,4- epoxycyclohexanecarboxylate), vinylcyclohexene dioxide, divinylbenzene dioxide, 1,5- pentadiol bis(3,4- epoxycyclo-hexane carboxylate), ethylene glycol bis(3,4- epoxycyclo-hexane carboxylate), 2,2-diethyl- 1,1,3- propanediol bis(3,4- epoxycyclohexanecarboxylate), 1,6- hexanediol bis(3,4-epoxycyclohexanecarboxylate), 2-butene-1,4-diol trimethylolpropane tris (3,4-expoxy-6- methylcyclohexanecarboxylate), 1,1,1-trimethylolpropane tris (3,4- expoxycyclohexanecarboxylate), 1,2,3-propanetriol tris(3,4-epoxycyclohexanecarboxylate), dipropylene glycol bis(2-ethylhexyl-4,5-epoxycyclohexane-1,2- dicarboxylate), diethylene glycol bis(3,4-epoxy-6- methylcyclohexanecarboxylate), triethylene glycol bis(3,4 -epoxycylohexanecarboxylate), 3,4-epoxycyclohexyl-methyl 3,4- epoxycyclohexanecarboxylate, 3,4-epoxy-1- methylcyclohexylmethyl 3,4-epoxy-1-methylcyclohexane-carboxylate, bis(3,4- epoxycyclohexylmethyl) pimelate, bis(3,4-epoxy-6- methylenecyclohexylmethyl) maleate, bis(3,4-epoxy-6-methylcyclohexylmethyl) succinate, methylcyclohexylmethyl) sebacate, bis(3,4-epoxy-6-methylcyclohexylmethyl) adipate, bis(3,4- epoxycyclohexylmethyl) terephthalate, 2,2'- sulfonyldiethanol bis(3,4-epoxycyclohexanecarboxylate), N,N'-ethylene bis(4,5-epoxycyclohexane-1,2-dicarboximide), di(3,4- epoxycyclohexylmethyl) 1,3-tolylenedicarbamate, 3,4-epoxy-6-methylcyclohexanecarboxaldehyde acetal, 3,9-bis( 3,4-epoxycylohexyl) spirobi-(methadioxane), and the like.

Useful thermosetting resins also include phenolic resins produced by the reaction of phenols and aldehydes. Useful phenols include phenol, o- cresol, m- cresol, p-cresol, p-tertbutylphenol, p-tertoctylphenol, p-nonylphenol, 2,3-xylenol, 2,4- xylenol, 2,5-xylenol, 2,6-xylenol, 3,1-xylenol, 3,4-xylenol, resorcinol, bispenol-A and the like. Useful aldehydes include formaldehyde, acetaldehyde, propionaldehyde, n-butyraldehyde, isobutyraldehyde, glyoxal, furfural and the like.

Other useful thermosetting resins are vinylesters such as the condensation product of epoxide resins and unsaturated acids usually diluted in a compound having double bond unsaturation such as vinylaromatic monomer as for example styrene and vinyltoluene, and diallyl phthalate. Illustratrive of useful vinylesters are diglycidyl adipate, diglycidyl isophalate, di-(2,3- epoxybutyl) adipate, di-(2,3-epoxybutyl) oxalate, di- (2,3-epoxyhexyl) succinate, di-(3,4-epoxybutyl) maleate, di-(2,3-epoxyhexyl) succinate, di-(3,4-epoxybutyl) maleate, di-(2,3-epoxyoctyl) pimelate, di-(2,3-epoxybutyl) phthalate, di-(2,3-epoxyoctyl)tetrahydrophthalate, di-( 4,5-epoxy-dodecyl) maleate, di-(2,3-epoxybutyl) terephthalate, di-(2,3-epoxypentyl) thiodipropionate, di- (5,6-epoxy-dodecyl)maleate, di- (2,3-epoxybutyl) terephthalate, di-(2,3-epoxyoctyl) tetrahydrophthalate, di-(4,5-epoxy-dodecyl) maleate, di-(2,3-epoxybutyl) terephthalate, di-(2,3-epoxypentyl) thiodipropionate, di- 5,6-epoxy-tetradecyl)diphenyl-dicarboxylate, di-(3,4- epoxyheptyl) sulphonyldibutyrate, tri-(2,3-epoxybutyl) 1,2,4 butanetricarboxylate, di-(5,6-epoxypentadecyl)maleate, di-(2,3-epoxybutyl) azelate, di(3,4-epoxypentadecyl) citrate, di-(5,6-epoxyoctyl) cyclohexane-1,3-dicarboxylate, di-(4,5-epoxyoctadecyl) malonate, bisphenol-A-fumaric acid polyester and the like.

Preferred polymeric binders are phenol-aldehyde resins either alone or in a mixture with other resins such as acid or base catalyzed thermosetting resol or novolak type resins prepared from a phenol such as phenol, cresol, xylenol, para-t-butylphenol, p-phenylphenol, bisphenols and resorcenol and an aldehyde such as formaldehyde and furfural, and derivatives thereof such as epoxidized and cyanated phenol-aldehyde resins. Illustrative of such phenol-aldehyde resins are those described in "The Chemistry of Phenolic Resins" by Robert W. Martin, published 1965 by John Witley & Sons; "Phenoplasts" by T. S. Carswell published in 1947 by Interscience Publishers; U.S. Pat. Nos. 2,559, 664; 2,779,668; 2,521,911; 2,585,196; 2,557,922; 2.617, 785; 2,675,335; 2,552,025; 4,268,657; 4,022,755; 3,966, 670; 4,239,666; 4,657,951; 4.219.452; 4.096,108 and 3,455, 868; Canadian Patent No. 1,148,708; and 4,218,361.

The amount of polymeric binder may vary widely and any amount can be used as for example the amounts used in conventional friction materials. Usually, the amount of polymeric binder is at least about 5% by weight of the total friction material composition. The amount of polymeric binder is preferably from about 5 to about 15% by weight, more preferably from about 6 to about 5% by wgt. and most preferably from about 7 to about 12% by weight based on the total weight of binder and friction filler in the composition.

The composition of the present invention may further comprise various optional ingredients. Illustrative of such ingredients are those materials typically used in friction resistant compositions. Such optional materials include inorganic and organic fillers, coupling agents, colorants, stabilizers, flame retardants, and organic modifiers.

Useful friction resistant fillers include fibers and powders. Such fibers and powders may be selected from a wide variety of organic and nonorganic materials such as polymers, minerals, metals, metal oxides, siliceous materials and metal salts such as asbestos fibers, glass fibers, silica fibers, phenolic fibers, and metal fibers such as iron, and steel fibers and particulate abrasion resistant materials as for example those selected from the refractory metal borides, carbides, nitrides, oxides, and mixtures such as the borides of aluminum, niobium, silicon, tantalum, titanium, tungsten and zirconium; carbides of boron, niobium, silicion, tatalum, titanium, tungsten and zirconium; and oxides of aluminum, niobium, silicon, tatalum, titanium, tungsten and zirconium.

Other suitable fillers known to those of skill in the art can be used as for example, plate like, fibrous and particulate forms of alumina, brass powder, aluminum hydrates, iron oxide, feldspar, lead oxides, asbestos, talc, barytes, calckum carbonates, clay, carbon black, quartz, novaculite and other forms of silica, kaolinite, aluminum silicate bentonite, garnet, mica, saponite, beidelite, calcium oxide, fused silica, calcium hydroxide, thermoplastic polymers as for example, polyesters, polyimides, polyamides polysulfones, polyaramids, polyester carbonates, polyethers, polyethersulfones, polyolefins, polycarbonates, polyetherimides, polysulfides, polyacrylates, polyvinyls and the like. The forgoing recited fillers are illustrative only and are not meant to limit the scope of the fillers that can be utilized in this invention.

The abrasion resistant particles can be coated with coupling agents to improve adhesion to the polymer. Coupling agents which can be used to coat the abrasive resistant particles include gamma-amino propyl triethyoxysilane; gamma-glycidyl propyl trimethoxsilane; and N-beta-aminoethyl)-gamma-amino propyl trimethoxysilane.

In particular for use as brake pads and clutch pads useful fillers include organic and inorganic fibrous materials including iron or steel fibers, asbestos fibers, polyaramid fibers, glass fibers, phenolic resin fibers,thermotropic liquid polyester fiber, and the like. Useful inorganic materials can include any or all of the following in any combination: barytes, whiting, talc, alumina, silica, calcium carbonate, and the like. Useful organic materials include any combination of elastomeric materials of either natural of synthetic rubber scraps, latex, crude molasses, asphaltic base materials, and the like. Particularly useful and well known filling materials are friction dust such barium sulfate, calcium carbonate, cashew dust and rubber dust; metal dust which is powdered metals such as iron, copper and aluminum; and coupling agents and the like. Useful glass fibers include the glass fibers disclosed in Canadian Patent No. 1,148,708 hereby incorporated by reference.

The composition of the present invention generally comprises the critical friction resistant filler and a amount of binder sufficient to bind the filler. The composition can be formed using conventional procedures. Methods for producing reinformed and/or filled compositions include metal blending, extrusion and molding processes, simple mixing and dispersion of both materials in a suitable medium by methods known in the art. The powdered solids and fibers, and resin can be together in a mechanical mixer such as an Eirich mixing apparatus until the mixture of filler, additives and resin is uniform. A predetermined quantity of the mix is placed in a pre-heated mold. The composite is then shaped to form the desired article such as a brake lining. Under the influence of pressure and temperature the thermoset resin crosslinks to form resin networks useful in such articles. Typical conditions for molding the composition of the present invention are at 40° to 180° C., preferably 60° to 160° C., at a pressure of 3,000 to 20,000 psi, preferably 5,000 to 10,000 psi for a time of from 6 seconds to 15 minutes and preferably 90 seconds to 10 minutes. After molding the molded composites can be transferred to an oven where the temperature is increased to completely cure the resin matrix which holds the fibers and other additives together. The post cured sample is trimmed and machined to is final shape.

Useful articles made from the surface modified metal fibers include those formed from conventional friction materials. Illustrative of such articles are friction resistant articles such as brake pads, discs, clutch pads, and the like.

Several examples are set forth below to illustrate the nature of the invention and the manner of carrying it out. However, the invention should not be considered as being limited to the details thereof. All parts are by weight unless otherwise indicated.

EXAMPLE I

A series of experiments were carried out to show the effect of oxidized fibers on the tensile stress of friction materials containing such fibers. Brass fiber, uniform copper fiber and jutter turned copper fiber were treated with Enplate MB 438A and 438B an oxidizing finish prepared by mixing the described solutions together which containing a proprietary mixture of ingredients obtained from Enthone Inc. Each of the oxidized fibers, and for comparison purposes the non-oxidized fiber, were compounded into six friction material samples having the composition set in the following Table I. In Table I, the abbreviations have the following meanings:

(A) "Resin" is a phenol formadehyde resin obtained from Borden.

(B) "Impact Modifier" is a carboxy terminated acrylonitrile butadiene rubber obtained from B. F. Goodrich under the tradename of HYCAR.

(C) "Mineral Filler A" is $BaSO_4$ obtained from Cypress Industrial Minerals Co.

(D) "Mineral Filler B" is CaSO4 obtained from USG Interiors under the Franklin Fiber Tradename.

E) "Abrasive" is MgO obtained from Insul Therm Corp.

(F) "Lubricant" is Graphite obtained from The Carbon Graphite Group.

TABLE I

Friction Material Formulations

| MATERIAL | VOLUME PERCENT |
| --- | --- |
| Resin | 25.9 |
| Metal Fiber | 3.4 |
| Impact Modifier | 11.0 |
| Mineral Filler A | 12.5 |
| Mineral Filler B | 27.8 |
| Abrasive | 2.8 |
| Lubricant | 16.7 |

The ingredients were added to the mixer and the mixer was turned on and mixed until the sample was uniform. Part of the mixture was then weighed and transferred to a heated mold and pressed until a coherent specimen was produced. The sample was then further cured using a ramped temperature cycle. These procedures are well known to those skilled in the art of friction materials fabrication. The six test friction elements are as set forth in the following Table II.

TABLE II

| Test Friction Element | Metal Fiber |
| --- | --- |
| A | Oxidized Brass Fiber |

TABLE II-continued

| Test Friction Element | Metal Fiber |
| --- | --- |
| B | Brass Fiber |
| C | Oxidized Jutter Turned Copper Fiber |
| D | Jutter Turned Copper |
| E | Oxidized Copper Fiber |
| F | Copper Fiber |

The tensile stress properties of the friction element were evaluated by the procedure of ASTM E 399. Tensile strength properties of the element were selected for evaluation because these properties impact on the mechanical integrity of the element under use of the element. The results are set forth in the following Table III and in FIG. 1.

TABLE III

| Exp. No. | Element | Tensile Strength (ksi) |
| --- | --- | --- |
| 1 | A | 1.5 |
| 2 | B | 1.1 |
| 3 | C | .96 |
| 4 | D | 6.5 |
| 5 | E | 1.1 |
| 6 | F | 1.4 |

The mechanical enhancement seen with the oxidized jutter(J) turned fiber was greater than the enhancement seen with the more uniform copper fiber. This is most readily explained by the difference in fiber geometry. The jutter turned copper fiber has a small aspect ratio and benefited more by the surface modification with improved adhesion to the matrix.

What is claimed is:

1. An improved friction composition of the type comprising a fibrous filler and a polymeric binder in an amount sufficient to bind such fillers, the improvement comprising one or more fillers selected from the group consisting of oxidized metal fibers, oxidized/phosphatized metal fibers, phosphatized metal fibers or a combination thereof.

2. An improved composition according to claim 1 wherein said fillers are oxidized metal fibers.

3. An improved composition according to claim 2 wherein said metal fibers are formed totally of metal having an oxidized surface layer.

4. An improved composition according to claim 3 wherein said metal is selected from the group consisting of copper, brass, bronze, steel, iron, aluminum, and alloys thereof.

5. An improved composition according to claim 4 wherein said metal is selected from the group consisting of copper, brass, bronze, steel, and aluminum.

6. An improved composition according to claim 5 wherein said metal is selected from the group consisting of copper and brass.

7. An improved composition according to claim 6 wherein said metal is copper.

8. An improved composition accordng to claim 6 wherein said metal is brass.

9. A friction resistant article comprising a body, said body comprising a friction means formed totally or in part from a friction composition comprising a fibrous filler selected from the group consisting of oxidized metal fiber and phosphatized metal fiber and a polymer binder in an amount sufficient to bind said fillers.

10. The improved friction composition of claim 1 wherein said fillers are selected from the group consisting of oxidized/phosphatized metal fibers, phosphatized metal fibers, or a combination thereof.

11. The improved friction composition of claim 10 wherein said metal is selected from the group consisting of copper, brass, bronze, steel, iron, aluminum, and alloys thereof.

12. The improved friction composition of claim 11 wherein said metal is selected from the group consisting of copper, brass, bronze, steel, and aluminum.

13. The improved friction composition of claim 12 wherein said metal is selected from the group consisting of copper and brass.

14. The improved friction composition of claim 13 wherein said metal is copper.

15. The improved friction composition of claim 14 wherein said metal is brass.

16. The friction resistant article of claim 9 wherein said fibrous filler is oxidized metal fibers.

17. The friction resistant article of claim 16 wherein said oxidized metal fibers are formed totally of metal having an oxidized surface layer.

18. The friction resistant article of claim 17 wherein said metal is selected from the group consisting of copper, brass, bronze, steel, iron, aluminum, and alloys thereof.

19. The friction resistant article of claim 18 wherein said metal is selected from the group consisting of copper, brass, bronze, steel, and aluminum.

20. The friction resistant article of claim 19 wherein said metal is selected from the group consisting of copper and brass.

21. The friction resistant article of claim 20 wherein said metal is copper.

22. The friction resistant article of claim 21 wherein said metal is brass.

23. An improved friction composition of the type comprising a fibrous filler and a polymeric binder in an amount sufficient to bind such fillers, the improvement comprising one or more fillers selected from the group consisting of oxidized metal fibers, oxidized/phosphatized metal fibers, phosphatized metal fibers, or a combination thereof wherein said metal is selected from the group consisting of brass and copper.

24. The improved friction composition of claim 23 wherein said metal is copper.

25. The improved friction composition of claim 23 wherein said metal is brass.

* * * * *